Nov. 7, 1961        A. C. CHADWICK        3,007,809

PROCESS OF MAKING REINFORCED FLEXIBLE PLASTIC TUBING

Filed June 20, 1958        2 Sheets-Sheet 1

INVENTOR.
ALFRED C. CHADWICK.

BY Melvin Lord

ATTORNEY

Nov. 7, 1961 A. C. CHADWICK 3,007,809
PROCESS OF MAKING REINFORCED FLEXIBLE PLASTIC TUBING
Filed June 20, 1958 2 Sheets-Sheet 2

INVENTOR.
ALFRED C. CHADWICK,
BY
*Melvin Nord*
ATTORNEY

3,007,809
PROCESS OF MAKING REINFORCED FLEXIBLE PLASTIC TUBING
Alfred C. Chadwick, Bloomfield Township, Mich., assignor to Permalastic Products Co., Detroit, Mich.
Filed June 20, 1958, Ser. No. 743,377
8 Claims. (Cl. 117—72)

This invention relates to continuous processes for the production of reinforced flexible plastic hose or tubing, and to articles of manufacture produced thereby. More specifically, it provides processes for producing a flexible plastic hose by continuously coating a self-supporting woven hose by immersion in a plastisol, followed by gelling under the application of heat; in addition, it provides articles of manufacture produced thereby.

Prior art

So far as I am aware, no continuous process for the production of reinforced flexible rubber or plastic hose or tubing has ever been developed, at least on a commercially feasible basis. The usual methods for producing reinforced flexible rubber or plastic hose or tubing are inherently of a batch nature. They normally involve such batchwise mechanical operations as the braiding or winding of a fabric, pulling a flexible tubular cover member over a self-supporting member, plying consecutive layers of rubber and fabric on a mandrel, removal of the mandrel, etc. Not only are these processes inherently batchwise, but they are also inherently expensive.

Numerous attempts have been made in the past to simplify the manufacture of flexible hose by the substitution of coating processes for some of the usual mechanical processing steps. Most of these processes have involved the formation of rubber articles such as tubes, by dipping in a latex suspension. So far as we are aware, none of these has been a continuous process. The reason for this appears to be because of the necessity of drying the coating, i.e. of removing large quantities of water from the latex, and a long, low temperature cure or vulcanization period. This causes a very considerable shrinkage of the coating. Consequently, it is necessary to produce relatively thin deposits or coatings of rubber which, after drying, must be increased in thickness by repeated dipping operations. This limitation on the process— need for the evaporation of large quantities of diluent— inherently makes these processes batch, rather than continuous processes. In addition, the time required for curing is normally excessive, from the point of view of a continuous process.

With the discovery of new plastic materials which may advantageously be used in place of rubber, because of their improved physical and chemical properties, efforts at providing improved processes for the production of flexible hose have continued, but still along batchwise lines. An example of such a proposed process is disclosed in U.S. Patent 2,260,282, issued to William H. Grint in 1941. Grint proposed the production of flexible hose for gasoline or oil by a process which comprised in part coating the inside and outside of a length of braided or woven tube-formers by repeated dipping actions in a polyvinyl alcohol resin solution, with drying actions between each dip. In a set of nineteen drawings, Grint disclosed a number of ways of accomplishing this process. All of them involved batch processes. Grint explicitly pointed out that the coating must be applied layer by layer. As indicated above, this is true whenever it is necessary to evaporate substantial quantities of a volatile solvent or diluent.

I have sought to overcome these difficulties, and to provide a truly continuous process for the production of a reinforced flexible plastic tubing which will contain both an inner and an outer coating of a flexible plastic. In my efforts to accomplish this, I have found it necessary not only to solve the problem of how to deposit a reasonably thick coating on a tube-former without excessive shrinkage caused by evaporation or drying, but also another problem which militates against a continuous process. It is necessary to coat the inside as well as the outside of the tube-former, in order to provide the inner surface of the hose with the desired chemical properties of corrosion resistance, and the desired physical properties of low abrasion and low resistance to the flow of fluids. But if the process is to be truly continuous, one cannot dip relatively short lengths of tube-former into a fluid bath, as is proposed by Grint, but must run an uninterrupted tube-former continuously through the apparatus. This means that there is no direct access to the interior of said tube-former, but only to its exterior. This raises the specter of some extremely cumbersome methods of obtaining access to the inner surface from the ends of the tube-former, none of which is in the least attractive.

Objects of the present invention

Thus, it is an object of my invention to overcome the difficulties described above—namely, (1) avoiding the shrinkage problem caused by evaporation or drying of a solvent or diluent, (2) finding a simple means of access of the plastic coating material to the inner surface of the tube-former, and (3) providing a material which will cure or set during a sufficiently short heat cycle to be practical for a continuous operation, and thus to provide a commercially feasible continuous process for the production of reinforced flexible plastic hose or tubing.

My solution to the first of these problems basically involves the use, as the coating medium, of a fluid dispersion in which the fluid suspending agent is not water or a solvent for the resin, but is a nonvolatile plasticizer. Since the plasticizer and the resin both remain in the final coating, substantially no evaporation occurs. Upon heating to the appropriate temperature, the dispersion "gels" or "sets" to form the finished coating, without evaporation. In other words, my solution to the problem of shrinkage caused by evaporation is based on an altogether different approach from that hitherto used in the manufacture of tubes and hoses. Instead of trying to minimize shrinkage by applying many coats, a little at a time, so as to require the evaporation of only relatively small amounts of solvent or diluent, I eliminate the problem altogether, by not using any significant amount of solvent or diluent. The manner in which this may be accomplished is disclosed below.

My solution to the second of the problems mentioned above is basically to dip the uninterrupted hose-former in a plastisol or fluid dispersion of the resin and plasticizer, under such conditions that the plastisol penetrates the hose-former to a sufficient extent to form a coating on both the inside and outside surfaces of the hose-former.

The manner in which this may be accomplished is disclosed below.

My solution to the third problem—that of providing a short enough "curing" or setting time to make a continuous process feasible—is also based on the use of plastisols, as indicated below.

Thus, a basic object of the present invention is to provide a continuous process for the production of reinforced flexible plastic hose or tubing.

A second object of the invention is to provide a continuous process for the production of reinforced flexible plastic hose or tubing, in which process little or no drying or evaporation of diluents is necessary.

A third object of the invention is to provide a continuous process for the production of reinforced flexible plastic hose or tubing, by continuously coating a self-supporting woven hose by immersion in a plastisol, followed by gelling under the application of heat.

A fourth object of the invention is to provide a method for simultaneously producing both an inner and an outer plastic coating for a reinforced flexible plastic hose or tubing, by immersion of a self-supporting woven hose-former in a plastisol under such conditions that the plastisol penetrates the hose to a sufficient extent to form a coating on both the inside and outside surfaces of the hose.

A fifth object is to provide, as an article of manufacture, a reinforced flexible plastic hose or tubing, comprising a spirally wound reinforcing wire, with longitudinal fabric strands closely woven about the loops of said wire, and integral inner and outer coatings thereon comprising a gelled vinyl plastisol.

*Advantages of the present invention*

An advantage of my invention is that, in contradistinction to prior processes, it makes it possible to produce flexible hose by a continuous process.

A second advantage of the invention is that cumbersome mechanical steps normally required in the production of hose are eliminated.

A third advantage of the invention is that the need for drying or evaporating large quantities of diluents is obviated.

A fourth advantage is that the hose produced by the process of the present invention is coated with a plastic material both on its inner and outer surfaces, despite the fact that no direct feed of plastic material to the inner surface of the hose is used.

A fifth advantage is that the hose produced by the process of the present invention is considerably lower in cost, in view of the continuous nature of the process, the elimination of cumbersome mechanical steps, the elimination or minimization of the need for the use of diluents, the minimization or elimination of drying or evaporation of water or diluents, and the elimination of long low temperature cure or set periods.

Other objects and advantages of my invention will more fully appear from the following description and drawings, wherein are disclosed preferred embodiments of my invention.

*Drawings*

In the drawings.

In the drawings, similar numerals refer to similar parts.

*Description of the invention*

Figure 1:
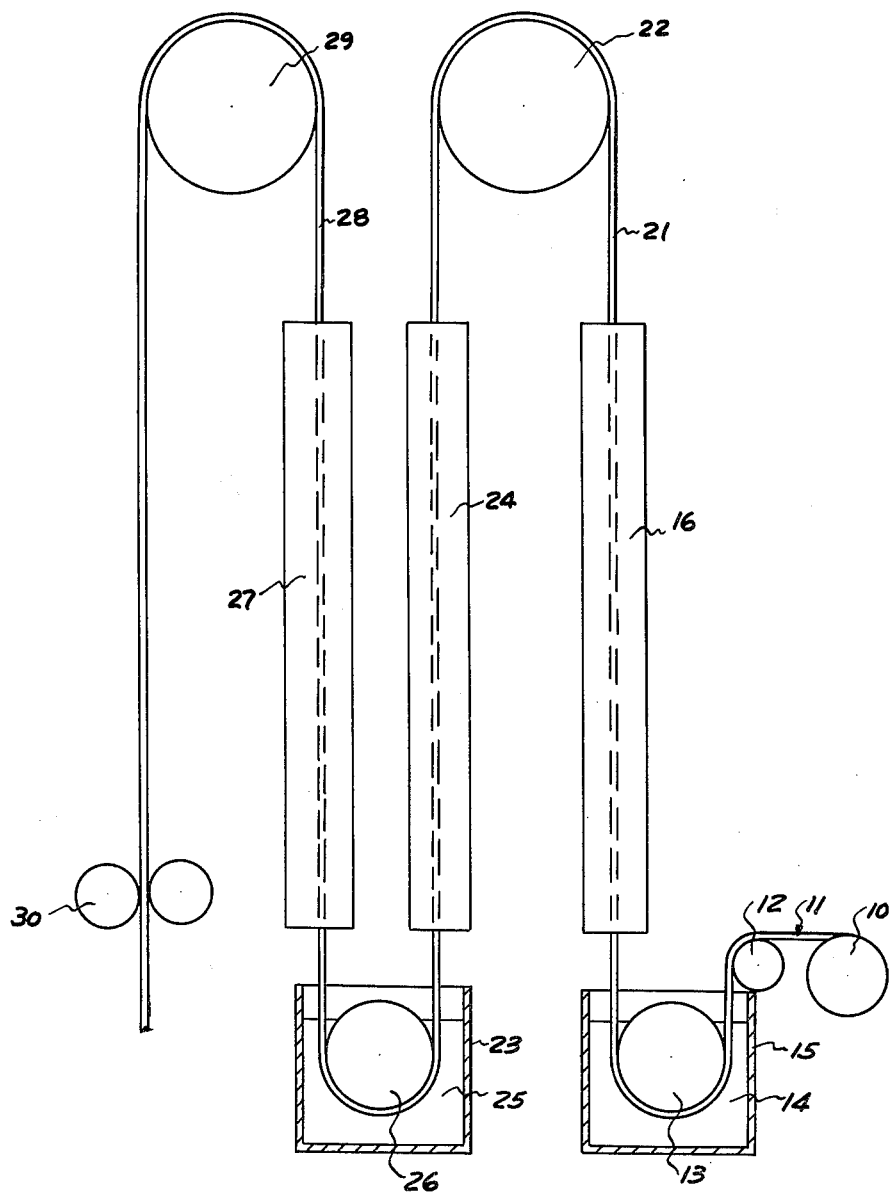
FIG. 1 represents a schematic diagram of a preferred embodiment of the process of this invention.

Preferred embodiments of the process of the present invention are shown in FIG. 1 wherein is schematically shown a continuous process for the production of reinforced flexible plastic hose or tubing.

In FIG. 1, the numeral 10 represents a reel of self-supporting woven hose or hose-former 11, which may for example comprise a fabric woven around a spiral wire reinforcement. Said hose-former 11 passes over a guide roll 12, and then below a guide roll 13 which is at least partially immersed in a fluid plastisol bath 14 contained in a first dip tank 15. Following its immersion in said fluid plastisol 14, the hose-former 11, carrying a coating of plastisol, passes through a vertical oven 16 in which the plastisol is heated to a temperature sufficient to cause it to gel or "set." If no additional coatings are desired the reinforced flexible plastic hose may then be collected in any desired manner; alternatively, if additional treatments are desired, the process may be continued further, as shown in the drawing.

Figure 2:
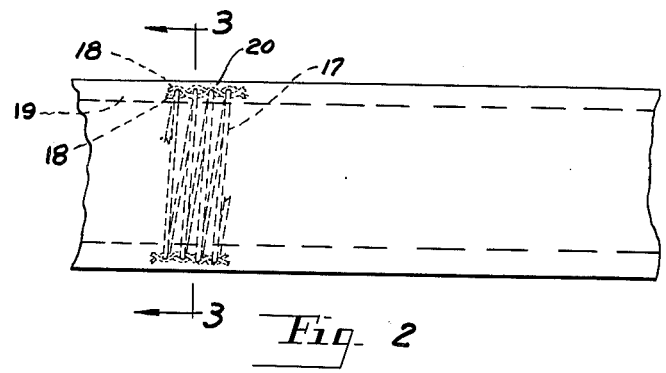
FIG. 2 represents a side view of an embodiment of the finished product of the invention.
Figure 3:
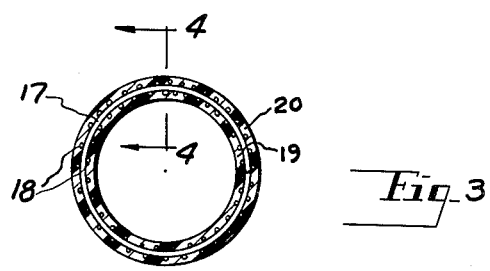
FIG. 3 is a cross-sectional view taken along the lines III—III of FIG. 2.
Figure 4:
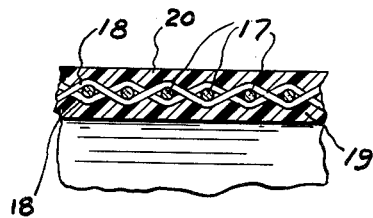
FIG. 4 is a cross-sectioned view taken along the lines IV—IV of FIG. 3.

While there is no one particular coarseness or fineness of weave of said hose-former 11 which can be singled out as critical in connection with use in the present process, the degree of porosity of said hose-former 11 must not be excessively small, relative to the viscosity of the plastisol bath 14 (otherwise there will be inadequate penetration for the formation of an inner coating). Similarly, the degree of porosity of said hose-former 11 must not be so great, relative to the viscosity of the plastisol bath 14, as to make it impossible to produce an inner or an outer coating. In general, I prefer to use, in the hose-former, a weave having only minute openings therethrough, preferably of the order of magnitude of $10^{-3}$ inches. A preferred hose-former 11 is shown in FIGS. 2–4 which comprises a spiral wire 17 which may for example be $\frac{1}{16}''$ in diameter, with for example a $\frac{1}{8}''$ pitch or distance between adjacent loops; closely woven around the loops of said wire, in a longitudinal direction (i.e. parallel to the axis of the hose), are strands 18 of cotton, Orlon, or other fibrous material, which may for example be $\frac{1}{32}''$ in diameter. Strands 18 up to about $\frac{3}{16}''$ in diameter may be used, provided the weave is tight enough. Smaller strands may also be used, provided some substantial opening in the weave still exists. By "closely-woven" is meant that adjacent strands come substantially in contact with each other (e.g. in the spaces between loops of wire 17—one strand 18 passing over a given wire loop and the strands adjacent thereto passing under it). I have found that both the porosity and strength of such hose-formers are satisfactory for use in the invention. The equivalent opening of such hose-formers is generally of the order of magnitude indicated above, i.e. about $10^{-3}$ inches.

As shown in FIGS. 3 and 4, the inner and outer plastisol coatings 19 and 20 substantially entirely cover the hose-former 11 (comprising wire 17 and strands 18); furthermore, said coatings are integral with each other and with said hose-former 11, forming an integral reinforced flexible plastic hose or tubing. This is the result of penetration of the fluid plastisol through the hose-former 11.

For a given depth of plastisol bath 14 (hence hydrostatic pressure), time of contact, and thickness of coating, the required viscosity of the plastisol bath 14 is found to vary approximately as the inverse square of the opening in said hose-former 11. Thus, rather wide variations in viscosity are required in order to correspond to different weaves of hose-former 11. Furthermore, since it is difficult to specify an accurate amount of opening in closely woven materials, it is difficult to give an accurate correlation of required bath viscosity with the porosity of the hose-former 11. Normally, the bath viscosities I have found most useful have been in the range 500 to 100,000 centipoises, preferably of the order of magnitude of 1000 centipoises.

Referring more particularly now to said fluid plastisol bath 14: An important aspect of the present invention resides in the fact that said bath 14 is of such a nature and composition that it need not contain any water or diluent, so that little or no drying or evaporation of the resulting coating will be required, thus avoiding the concomitant difficulties resulting from the accompanying large shrinkage in volume of the coating. Said bath is of the type known in the art as a "plastisol," that is to say, basically a finely divided resin polymer suspended in a liquid plasticizer. Stabilizers, pigments and fillers, diluents and other materials may also be included in plastisols to provide specific properties in the finished product or to modify the flow properties of the plastisol.

In the present invention, the resin selected must have properties appropriate to the desired finished product; that that is to say, it must have substantial flexibility, rather than stiffness. In addition, it must be capable of the formation of a plastisol, i.e. dispersion in a plasticizer. I have found polyvinyl chloride resins, and copolymers of polyvinyl chloride and other resins (such as copolymers of vinyl chloride and vinyl acetate or copolymers of vinyl chloride and vinylidene chloride), to be adaptable for this purpose, and for use in a continuous process of the type disclosed herein. Such plastisols are known in the art under the generic name "vinyl plastisols." The resin must be finely divided in order to be capable of dispersion in the plasticizer. Substantially all of the resin should be finer than 100 mesh, and it is prefrable that at least 50% be finer than 200 mesh.

In addition to the resin component, the other principal constitutent of a plastisol is the plasticizer. The selection of the plasticizer is of importance, since the plasticizer constitutes the sole (or at least the principal) dispersing agent, and thus determines, to a large extent the flow properties of the plastisol as well as the flexibility and other physical properties of the finished product. Flow properties of the fluid plastisol are of great importance in the present invention—in view of the fact that penetration of a tube-former is required under conditions which will permit the formation of both an inner and an outer coating—and in view also of the fact that the coating should not drip or streak as the coated hose-former 11 rises out of the bath 14 or subsequently, during the drying stage. Both the viscosity and solvating power of plasticizers affect the viscosity of the fluid plastisol. Initially, the viscosity of the plasticizer determines plastisol viscosity. On aging, the strongly solvating plasticizers swell the vinyl resin particles and increase plastisol viscosity. Secondary plasticizers (i.e. plasticizers which in themselves have limited compatibility to produce plastisols, or produce plastisols with extremely high viscosity) may also be added, in order to reduce the cost and to modify the properties of the plastisol. If the viscosity of the plastisol is excessively high, penetration of the hose-former 11 will not be sufficient to permit the formation of a complete inner coating of the hose. On the other hand, if the viscosity of the plastisol is excessively low, relative to the porosity of the hose-former 11, it will not be possible to produce adequate coatings on either the inner or the outer surfaces of the hose-former 11. No specific viscosity can be singled out as the proper one for use in the present invention, because of possible variations in porosity of the hose-former 11, thickness of coating desired, and contact time in the plastisol bath 14.

It is generally also desirable to add a small amount of a stabilizer to the fluid plastisol, in order to minimize heat and light deterioration. For example, a so-called "barium-cadmium stabilizer" may be used; this term is used in the art to designate barium-cadmium-chelating-epoxy systems. The stabilizer may, for example, be dispersed on a 3 roll ink mill; the resulting dispersion may then be added to the plastisol. If any pigments is desired to be used, it may also be added by dispersing it in a small amount of plasticizer on a three roll mill and then adding the resulting dispersion to the plastisol.

In order to control the coating weight, by reducing the viscosity, a small amount of volatile diluent may also be added to the plastisol. Refined aliphatics boiling in the kerosene range (generally known in the art as "oleum spirits") may, for example, be used for this purpose.

The amount of resin, relative to that of plasticizer, may be varied to give variations in desired properties such as flexibility, hardness, abrasion resistance, and solvent resistance.

Simple mixing of the various ingredients in conventional mixers produces the plastisol.

Typical formulations of the plastisol, which I have found suitable for use in the present process, include the following:

Formulation No. 1: Lbs.
  Polyvinyl chloride copolymer [1] _____ 65.62
  Dioctyl phthalate _____ 77.70
  Distilled phthalate ester [2] _____ 44.00
  Barium-cadmium stabilizer [3] _____ 0.5
  Oleum spirits _____ 5.25

[1] Such as Goodyear Tire & Rubber Co. Chemical Division "Pliovic AO."
[2] Such as Flexol 426, manufactured by Carbide & Carbon Chemicals Co.
[3] Such as Ferro 1203X, manufactured by Ferro Chemical Co.

Formulation No. 2: Lbs.
  Polyvinyl chloride _____ 28.0
  Dioctyl phthalate _____ 18.0
  Tricresyl phosphate _____ 3.3
  Polymeric ester plasticizer [1] _____ 1.3
  Barium-cadmium stabilizer [2] _____ 0.4

[1] Such as Paraplex G60.
[2] Such as Ferro 1203X.

The temperature of the plastisol bath 14 in the first dip tank 15 is not critical, so long as it is substantially below about 150° F., above which temperature, a substantial amount of gelling or "setting" takes place. There is no need for heating said bath 14 above room temperature at all; in fact, substantial heating may tend to reduce its viscosity unduly. Consequently, I prefer to maintain the plastisol bath 14 substantially at room temperature.

Referring more particularly now to the gelling or "setting" of the coating on the hose, after it has been removed from the plastisol bath 14: In order to cause the gelling or "setting" of the plastisol coating, it is necessary to heat it to a temperature in the range 250 to about 425° F. At lower temperature in this range, the time necessary for gelling increases greatly thereby requiring an increase in the size of the heating equipment and/or a reduction in productivity. On the other hand, at higher temperatures, the danger of scorching arises. Experiments with the present process have shown that a temperature of at least 350° F. is needed, in order to obtain high tensile strength in the finished product. At this temperature, we have found heating times of 8–10 minutes to be adequate for coatings about ⅛ inch thick. A temperature of about 400° F. has, however, been found to be the optimum temperature of operation of oven 16 for productivity purposes; at this temperature, a contact time of 4–5 minutes in oven 16 was sufficient. Thus, the preferred temperature of oven 16 is 375 to 425° F.

As shown in FIG. 1, I prefer to utilize a vertical oven 16, through which the coated hose-former 11 rises upwardly, without contacting any other surfaces in said oven 16. In this manner, I am able to obtain uniform inner and outer coatings 19 and 20, despite any tendency of the coatings to flow before being completely "set."

The diluent used in the plastisol bath 14—if any—will be evaporated as the coating approaches the temperature of the oven and will, in any event, be a relatively small quantity, not exceeding about 10% by weight and preferably not exceeding 5% by weight.

When the hose leaves the oven 16, the inner and outer coatings are "set," and have become integral with the hose-former 11, so that the hose now constitutes a reinforced flexible plastic hose capable of handling fluids. However, if it is desired to increase the thickness of the outer coating, without increasing the thickness of the inner coating, this can be accomplished by the method shown schematically in FIG. 1.

The coated hose 21, after leaving oven 16, passes over a guide roll 22 and then descends towards the second dip tank 23. An intermediate heating oven 24 may be utilized, if desired, for the purpose of controlling the thickness of the coating applied in the second dip tank 23. In this case, penetration of a fabric is not the problem, so that there is greater latitude in the selection of the temperature in the second dip tank. Thus, the operating temperature of oven 24 may be anywhere from room temperature up to about 425° F., depending on the properties of the fluid plastisol bath 25 and the desired thickness of the second coating.

Hose 21 passes below a guide roll 26, which is at least partially submerged in the fluid plastisol bath 25, and then rises upwardly through a second "setting" oven 27, operated under conditions generally similar to those described above with respect to the first "settling" oven 16, i.e. preferably in the temperature range of 375–425° F.

Finally, the finished hose 28 passes over a guide roll 29, then downwardly through a tension drive device 30, and is collected in any desired manner.

The finished hose has an excellent appearance and is extremely tough, flexible, and abrasion resistant. It is resistant to water, oil, gasoline, and all common acids and alkalis.

If desired, of course, additional coatings or coverings of various types may also be added over the outer coating of the hose.

While I have described preferred embodiments of my invention, it is to be understood that various modifications in the details of construction may be made without departing from the spirit of the invention as defined in the following claims, which are directed to the principal features of the invention rather than to the readily changeable details of construction.

I claim:

1. A process for simultaneously producing both an inner and an outer plastic coating for a reinforced flexible plastic hose, comprising: immersion of the outer surface of a self-supporting closely woven hose-former in a fluid plastisol bath; continuing said immersion for a time sufficient to permit the penetration of said hose-former by said fluid plastisol and the formation on the inner surface of a coating of predetermined thickness; withdrawing the resulting coated hose-former from said fluid plastisol bath; and heating said coated hose-former at a temperature and for a time sufficient to cause the setting of said plastisol.

2. The process of claim 1, wherein said plastisol comprises a finely divided vinyl resin dispersed in a plasticizer; contains not more than 10% by weight of a volatile diluent; and has a viscosity commensurate with the predetermined thickness of the inner coating to be produced on said hose-former under the existing conditions of time of immersion, depth of immersion, and porosity of said hose-former; and wherein the temperature of heating of said coated hose-former is in the range 250–450° F.

3. A continuous process for the production of reinforced flexible plastic hose, comprising: continuously passing a self-supporting closely-woven hose-former through a fluid plastisol bath; providing sufficient contact time in said bath for said plastisol to penetrate said hose-former and to form an inner coating of predetermined thickness; continuously withdrawing the resulting coated hose-former from said fluid plastisol bath; and thereafter heating said coated hose-former at a temperature and for a time sufficient to cause the setting of said plastisol.

4. The process of claim 3, wherein said plastisol comprises a finely divided vinyl resin dispersed in a plasticizer; contains not more than 10% by weight of a volatile diluent; and has a viscosity commensurate with the predetermined thickness of the inner coating to be produced on said hose-former under the existing conditions of time of immersion, depth of immersion, and porosity of said hose-former; and wherein the temperature of heating of said coated hose-former is in the range 250–450° F.

5. A continuous process for the production of reinforced flexible plastic hose, comprising: continuously passing a self-supporting closely-woven hose-former through a fluid plastisol bath; providing sufficient contact time in said bath for said plastisol to penetrate said hose-former and to form an inner coating of predetermined thickness; continuously withdrawing the resulting coated hose-former from said fluid plastisol bath; moving said coated hose-former upwardly in a substantially vertical manner, for a substantial distance; and, during said upward motion, heating said coated hose-former at a temperature and for a time sufficient to cause the setting of said plastisol.

6. The process of claim 5, wherein said plastisol comprises a finely-divided vinyl resin dispersed in a plasticizer; contains not more than 10% by weight of a volatile diluent; and has a viscosity commensurate with the predetermined thickness of the inner coating to be produced on said hose-former under the existing conditions of time of immersion, depth of immersion, and porosity of said hose-former; and wherein the temperature of heating of said coated hose-former is in the range 250–450° F.

7. A continuous process for the production of reinforced flexible plastic hose, comprising: continuously passing a self-supporting closely-woven hose-former through a fluid plastisol bath; providing sufficient contact time in said bath for said plastisol to penetrate said hose-former and to form an inner coating of predetermined thickness; continuously withdrawing the resulting coated hose-former from said fluid plastisol bath; moving said coated hose-former in substantially vertical manner for a substantial distance; during said upward motion, heating said coated hose-former at a temperature and for a time sufficient to cause the setting of said plastisol; thereafter regulating the temperature of the resulting coated hose in preparation for immersion in a second fluid plastisol bath, commensurate with the thickness of coating to be added over the aforesaid outer surface of said coated hose; continuously immersing said coated hose at such temperature in a second fluid plastisol bath; providing sufficient contact time in said second bath for the fluid plastisol contained therein to form an additional outer coating of predetermined thickness over said coated hose; continuously withdrawing the resulting re-coated hose from said second fluid plastisol bath; moving said re-coated hose upwardly in a substantially vertical manner for a substantial distance; and, during said upward motion, heating said re-coated hose at a temperature and for a time sufficient to cause the setting of the outermost plastisol coating.

8. The process of claim 7, wherein each of said plastisol baths comprises a finely divided vinyl resin dispersed in a plasticizer; contains not more than 10% by weight of a volatile diluent; the first of said fluid plastisol baths having a viscosity commensurate with the predetermined thickness of the inner coating to be produced on said hose-former under the existing conditions of time of immersion, depth of immersion, and porosity of said hose-former; the second of said fluid plastisol baths having a viscosity commensurate with the predetermined thickness of the additional outer coating to be produced on said coated hose under the existing conditions of time of immersion and depth of immersion; the temperature of heating following each immersion being in the range 250–450° F.

(References on following page)

References Cited in the file of this patent

UNITED STATES PATENTS

| | | |
|---|---|---|
| 2,164,296 | Wilcox | June 29, 1939 |
| 2,338,266 | Sponing | Jan. 4, 1944 |
| 2,418,974 | Henry | Apr. 15, 1947 |
| 2,437,542 | Kreppencloff | Mar. 9, 1948 |
| 2,602,959 | Fenlin | July 15, 1952 |
| 2,647,296 | Shive | Aug. 4, 1953 |
| 2,647,488 | Shive | Aug. 4, 1953 |
| 2,682,485 | Strickman | June 29, 1954 |
| 2,767,431 | De Laubarede | Oct. 23, 1956 |
| 2,879,803 | Francois | Mar. 31, 1959 |
| 2,906,638 | Herman | Sept. 29, 1959 |

FOREIGN PATENTS

| | | |
|---|---|---|
| 570,373 | Great Britain | July 4, 1945 |
| 766,308 | Great Britain | Jan. 15, 1957 |